United States Patent
Miura

(10) Patent No.: US 9,843,438 B2
(45) Date of Patent: Dec. 12, 2017

(54) TRANSMISSION DEVICE, RECEPTION DEVICE, AND TRANSCEIVER SYSTEM

(71) Applicant: THINE ELECTRONICS, INC., Tokyo (JP)

(72) Inventor: Satoshi Miura, Tokyo (JP)

(73) Assignee: THINE ELECTRONICS, INC., Tokyo (JP)

(*) Notice: Subject to any disclaimer, the term of this patent is extended or adjusted under 35 U.S.C. 154(b) by 0 days.

(21) Appl. No.: 15/109,953

(22) PCT Filed: Feb. 18, 2016

(86) PCT No.: PCT/JP2016/054752
§ 371 (c)(1),
(2) Date: Jul. 6, 2016

(87) PCT Pub. No.: WO2016/140076
PCT Pub. Date: Sep. 9, 2016

(65) Prior Publication Data
US 2017/0005784 A1    Jan. 5, 2017

(30) Foreign Application Priority Data
Mar. 4, 2015   (JP) .................... 2015-042052

(51) Int. Cl.
*H04L 7/027*     (2006.01)
*H04L 7/00*      (2006.01)
(Continued)

(52) U.S. Cl.
CPC .............. *H04L 7/027* (2013.01); *H04B 1/04* (2013.01); *H04B 1/16* (2013.01); *H04L 7/0008* (2013.01);
(Continued)

(58) Field of Classification Search
CPC ....... H04L 25/02; H04L 25/38; H04L 7/0008; H04L 7/0079; H04L 7/027; H04L 7/10
See application file for complete search history.

(56) References Cited

U.S. PATENT DOCUMENTS 8,363,771 B2     1/2013   Akita et al.
2005/0033544 A1* 2/2005   Brooks ................ G01R 33/02
                                             702/128

FOREIGN PATENT DOCUMENTS

JP    2001-292190 A   10/2001
JP       5374514 B2   12/2013
WO    2011/052141 A1   5/2011

OTHER PUBLICATIONS

International Search Report issued in PCT/JP2016/054752 dated Apr. 5, 2016.
(Continued)

*Primary Examiner* — Ross Varndell
(74) *Attorney, Agent, or Firm* — Sughrue Mion, PLLC

(57) ABSTRACT

The present embodiment relates to, for example, a transceiver system capable of notifying a transmission device of an asynchronous state of a reception device with a simple configuration. The reception device includes an input unit, a synchronous-state detector, a resistance-value controller, and a terminal resistor. When the synchronous-state detector detects the asynchronous state, the resistance-value controller sets a resistance value of the terminal resistor to a resistance value indicating the asynchronous state. The transmission device includes an output unit, an amplitude detector, an output controller, and a transmission resistor. The output controller causes the output unit to output a signal constituting normal data including clock information when the synchronous state of the reception device is detected, and causes the output unit to output a signal constituting training data including the clock information
(Continued)

when the asynchronous state of the reception device is detected.

10 Claims, 3 Drawing Sheets

(51) Int. Cl.
    *H04B 1/04*          (2006.01)
    *H04B 1/16*          (2006.01)
    *H04L 25/02*         (2006.01)
    *H04L 25/38*         (2006.01)
    *H04L 7/10*           (2006.01)

(52) U.S. Cl.
    CPC .............. *H04L 7/0079* (2013.01); *H04L 7/10* (2013.01); *H04L 25/02* (2013.01); *H04L 25/38* (2013.01)

(56) References Cited

OTHER PUBLICATIONS

International Preliminary Report on Patentability with the translation of Written Opinion dated Sep. 14, 2017, issued by the International Bureau in International application No. PCT/JP2016/054752.

\* cited by examiner

TRANSMISSION DEVICE, RECEPTION DEVICE, AND TRANSCEIVER SYSTEM

CROSS REFERENCE TO RELATED APPLICATIONS

This application is a National Stage of International Application No. PCT/JP2016/054752, filed on Feb. 18, 2016, which claims priority from Japanese Patent Application No. 2015-042052, filed on Mar. 4, 2015, the contents of all of which are incorporated herein by reference in their entirety.

TECHNICAL FIELD

The present invention relates to a transmission device, a reception device, and a transceiver system.

BACKGROUND ART

A clock data recovery (CDR) technique is used in a transceiver system that transmits a signal from a transmission device to a reception device through a transmission line (refer to Patent Literature 1). The transmission device transmits a signal constituting data including clock information embedded therein, to the reception device in the CDR technique. The reception device that has received the signal generates a recovery clock from the received signal, and samples the received signal at timing indicated by the recovery clock so as to generate recovery data. The reception device performs feedback control so that the received signal or the recovery data and the recovery clock correspond to each other in frequency and in phase.

In the reception device, a state where the received signal or the recovery data and the recovery clock correspond to each other in frequency and in phase, is referred to as a "synchronous state". Conversely, a state where the received signal or the recovery data and the recovery clock are different from each other in frequency and in phase, is referred to as an "asynchronous state".

When an action of the transceiver system starts, the transmission device transmits a signal constituting training data including the clock information (a training signal), to the reception device. The reception device generates a recovery clock from the training signal, and samples the training signal at timing indicated by the recovery clock so as to generate recovery data. The reception device causes the training signal or the recovery data and the recovery clock to correspond to each other in frequency and in phase, resulting in the synchronous state (clock training). The training data is, for example, data in which a predetermined pattern repeats in a constant cycle.

After the training, the transmission device transmits a signal constituting normal data including the clock information (significant data to be transmitted from the transmission device to the reception device in the synchronous state), to the reception device. The reception device in which the synchronous state has been established, generates the recovery clock from the received signal, and samples the received data at timing indicated by the recovery clock that has been generated, so as to generate the recovery data. The reception device causes the received signal or the recovery data and the recovery clock to correspond to each other in phase so as to retain the synchronous state in the reception device. Examples of the normal data include image data and control data necessary for an image display.

After the reception device has been in the synchronous state, when noise is superimposed on the signal due to an external cause, such as static electricity, in a case where the transmission device transmits the signal to the reception device through the transmission line, a shift in phase between the received signal or the recovery data and the recovery clock sometimes increases. Furthermore, a shift in frequency between these sometimes increases. In this case, the reception device becomes in the asynchronous state.

When becoming in the asynchronous state, the reception device notifies the transmission device of that effect, and also requests the transmission device to send out the training data. The transmission device that has received the request, transmits the training signal constituting the training data including the clock information, to the reception device. As the clock training, the reception device generates the recovery clock from the received signal, and samples the received signal at timing indicated by the recovery clock that has been generated, so as to generate the recovery data. Then, the reception device causes the received signal or the recovery data and the recovery clock to correspond to each other in frequency and in phase. Accordingly, the reception device can recover in the synchronous state.

CITATION LIST

Patent Literature

Patent Literature 1: JP 5374514 B2

SUMMARY OF INVENTION

Technical Problem

The present inventors have found the following problems based on a result of examination of a conventional transceiver system. That is, in the conventional transceiver system, a transmission line through which a reception device notifies a transmission device that the reception device has been in an asynchronous state, is provided separately from a transmission line through which the transmission device transmits training data and normal data (significant data to be transmitted from the transmission device to the reception device in data transmission mode except a training mode) to the reception data. As another example, in a case where full-duplex or half-duplex communication is performed in order to notify the transmission device that the reception device has been in an asynchronous state, from the reception device, a circuit configuration becomes complicated or a circuit scale increases in each of the transmission device and the reception device.

The transceiver system disclosed in Patent Literature 1 described above includes at least an one-bit transmission line provided between the reception device and the transmission, device in order to notify the effect that the reception device has been in the asynchronous state. However, in this case, although an effect of problems of circuit complication and a circuit scale is small, the number of transmission lines increases and also the number of external elements increases.

The present invention has been made in consideration of the above problems. An object of the present invention is to provide a transceiver system capable of notifying a transmission device that a reception device has been in an asynchronous state, with a simple configuration, together with the transmission device and the reception device that constitute the transceiver system.

Solution to Problem

A first aspect of a transceiver system according to the present embodiment includes the following transmission device and reception device.

The transmission device according to the present invention includes an output unit, an amplitude detector, and an output controller. The output unit is connected to the reception device through a transmission line, and outputs a signal constituting data including clock information embedded therein to the reception device. The amplitude detector detects amplitude of the signal in the output unit. Note that the amplitude detection is performed in order to determine whether the reception device is in any of different types of states including a synchronous state in which the signal and a clock recovered from the signal are synchronous, and an asynchronous state in which the signal and the clock are asynchronous. As an example of a specific configuration of the amplitude detection, the following configuration can be applied: the amplitude detector has an input end connected to a signal output end of the output unit through a transmission resistor, and monitors a voltage variation at the input end so as to detect the amplitude of the signal. The output controller controls a signal output action of the output unit to cause the output unit to output a signal constituting normal data including the clock information (significant data to be transmitted from the transmitter to the reception device in the synchronous state), in accordance with a detection result of the amplitude in a first range indicating the synchronous state, detected by the amplitude detector. The output controller controls the signal output action of the output controller to cause the output unit to output a signal constituting training data including the clock information, for clock training in the reception device, in accordance with a detection result of the amplitude in a second range, indicating the asynchronous state, different from the first range, detected by the amplitude detector. Note that the clock training means an action that establishes the synchronous state between the training signal and the recovered clock, using the training signal constituting the training data including the clock information, received in the reception device.

Meanwhile, the reception device according to the present embodiment includes an input unit, a synchronous-state detector, a terminal resistor, and a resistance-value controller. The input unit is connected to the transmission device through the transmission line, inputs the signal constituting the data including the clock information. embedded therein from the transmission device, recovers the clock from the input signal, and samples the signal at timing indicated by the recovered clock so as to recover the input data. The synchronous-state detector detects any of the synchronous state in which the input signal and the recovered clock are synchronous and the asynchronous state in which the signal and the recovered clock are asynchronous. The terminal resistor is provided between an input end of the input unit and a reference potential end. A resistance value of the terminal resistor is variable. The resistance-value controller sets the resistance value of the terminal resistor to a first resistance value indicating the synchronous state in accordance with a detection result of the synchronous state between the input signal and the recovered clock detected by the synchronous-state detector. The resistance-value controller changes the resistance value of the terminal resistor to a second resistance value different from the first resistance value in accordance with a detection result of the asynchronous state between the input signal and the recovered clock detected by the synchronous-state detector. In the reception device including the above configuration, the input unit inputs the training signal constituting the training data including the clock information for establishing the synchronous state, the training signal being outputted from the transmission device after the resistance-value controller has set. The resistance value of the terminal resistor to the second resistance value. As the clock training, the input unit recovers the clock from the input training signal and samples the training signal at timing indicated by the recovered clock so as to recover the training data. Then, the training signal and the recovered clock correspond to each other at least in phase so that the synchronous state in the reception device is established.

According to the present embodiment of the first aspect including the above configuration, the output unit in the transmission device outputs the signal constituting the data including the clock information embedded therein. The signal is input into the input unit in the reception device. The input unit in the reception device recovers the clock from the input signal, and samples the input signal at the timing indicated by the recovered clock so as to recover the data. In the reception device, the synchronous-state detector detects any of the synchronous state in which the recovered clock is synchronous with the input signal and the asynchronous state in which the input signal and the recovered clock are asynchronous. In the reception device, the resistance value of the terminal resistor is set to the first resistance value indicating the synchronous state, in accordance with the detection result of the synchronous state detected by the synchronous-state detector. Meanwhile, the resistance value of the terminal resistor is changed to the second resistance value different from the first resistance value in accordance with the detection result of the asynchronous state detected by the synchronous-state detector. In the transmission device, the amplitude detector detects the amplitude of the signal in the output unit. In accordance with the detection result of the amplitude in the first range, detected by the amplitude detector, the output controller controls the signal output action in the output unit so that the output unit outputs the signal constituting normal data including the clock information. Meanwhile, in accordance with the detection result of the amplitude in the second range different from the first range, detected by the amplitude detector, the output controller controls the signal output action of the output unit so that the output unit outputs the signal constituting the training data including the clock information. Note that, in the input unit in the reception device, the clock training is performed so as to establish the synchronous state. In the reception device, based on the training signal outputted from the transmission device after the resistance value of the terminal resistor has been set to the second resistance value.

Alternatively, a second aspect of the transceiver system according to the present embodiment may include the following transmission device and reception device.

The transmission device according to the present invention. includes an output unit, an amplitude detector, and an output controller. The output unit is connected to the reception device through a transmission line, and outputs a signal constituting data including clock information embedded therein to the reception device. The amplitude detector detects amplitude of the signal in the output unit. Note that the amplitude detection is performed in order to determine whether the reception device is in any of different types of states including a synchronous state in which the signal and a clock recovered from the signal are synchronous, and an asynchronous state in which the signal and the clock are asynchronous. As an example of a specific configuration of the amplitude detection, the following configuration can be applied: the amplitude detector has an input end connected to a signal output end of the output unit through a transmission resistor, and monitors a voltage variation at the input end so as to detect the amplitude of the signal. The output controller controls a signal output action of the output unit to cause the output unit to output a signal constituting normal data including the clock information (significant data to be transmitted to the reception device in the synchronous state), in accordance with a detection result of the amplitude in a first range indicating the synchronous state, detected by the amplitude detector. A signal controller controls the signal output action of the output unit to cause the output unit to output a signal constituting training data including the clock information over a predetermined period, and to cause the output unit to output the signal constituting the normal data including the clock information after the predetermined period has passed, in accordance with a detection result of amplitude changed from the first range to a second range indicating the asynchronous state and different from the first range, detected by the amplitude detector.

The reception device according to the present embodiment includes an input unit, a synchronous-state detector, a terminal resistor, and a resistance-value controller. The input unit is connected to the transmission device through the transmission line, inputs the signal constituting the data including the clock information embedded therein from the transmission device, recovers the clock from the input signal, and samples the signal at timing indicated by the recovered clock so as to recover the data. The synchronous-state detector detects any of a synchronous state in which the input signal and the recovered clock are synchronous and an asynchronous state in which the input signal and the recovered clock are asynchronous. The terminal resistor is provided between an input end of the input unit and a reference potential end. A resistance value of the terminal resistor is variable. The resistance controller sets the resistance value of the terminal resistor to a second resistance value, different from a first resistance value indicating the synchronous state, over a predetermined period, in accordance with a detection result of a change from the synchronous state to the asynchronous state or duration of the asynchronous state during a certain period or more, detected by the synchronous-state detector. Furthermore, the resistance controller changes the resistance value of the terminal resistor from the second resistance value to the first resistance value after the predetermined period has passed. In the reception device including the above configuration, the input unit inputs the training signal constituting the training data including the clock information, for establishing the synchronous state, outputted from the transmission device after the resistance-value controller has set the resistance value of the terminal resistor to the second resistance value. As the clock training, the input unit recovers the clock from the input training signal and samples the training signal at timing indicated by the recovered clock so as to recover the training data. Then, the training signal and the recovered clock correspond to each other at least in phase so that the synchronous state in the reception device is established.

According to the embodiment of the second aspect including the above configuration, the output unit in the transmission device outputs the signal constituting the data including the clock information embedded therein. The signal is input into the input unit in the reception device. The input unit in the reception device recovers the clock from the input signal, and samples the input signal at the timing indicated by the recovered clock so as to recover the data. In the reception device, the synchronous-state detector detects the change from the synchronous state to the asynchronous state or the duration of the asynchronous state during the certain period or more in the reception device. In the reception device, the resistance value of the terminal resistor is set to the first resistance value indicating the synchronous state, in accordance with the detection result of the synchronous state detected by the synchronous-state detector. In the reception device, the resistance value of the terminal resistor is changed from the second resistance value to the first resistance value after the resistance value of the terminal resistor is changed from the first resistance value to the second resistance value over the predetermined period, in accordance with the detection result of the asynchronous state detected by the synchronous-state detector. In the transmission device, the amplitude detector detects the amplitude of the signal in the output unit. The output controller controls the signal output action of the output unit to cause the output unit to output the normal data including the clock information, in accordance with the detection result of the amplitude in the first range, detected by the amplitude detector. Meanwhile, the output controller controls the signal output action of the output unit to cause the output unit to output the signal constituting the normal data including the clock information after the output unit outputs the training signal constituting the training data including the clock information over the predetermined period, in accordance with the detection result of the amplitude, changed from the first range to the second range, detected by the amplitude detector. In the input unit in the reception device, the clock training is performed based on the training signal after the resistance value of the terminal resistor is set to the second resistance value so that the synchronous state in the reception device is established.

A third aspect of the transceiver system according to the present embodiment may include the following transmission device and reception device.

That is, at least any transmission device of the above first and second aspects is applied to the transceiver system of the third aspect. In addition, an output controller of the transmission device that has been applied, controls an output unit to perform another action except output of training data, in accordance with a detection result of amplitude in a third range, different from both first and second ranges, detected by an amplitude detector. In this case, at least any reception device of the above first and second aspects is applied to the transceiver system of the third aspect. In addition, a resistance value of a terminal resistor is preferably set to a third resistance value over a certain period when a resistance-value controller of the reception device that has been applied, requests an action, except the output of the training data, of the transmission device.

Advantageous Effects of Invention

According to the present embodiment, a transmission device can be notified of an asynchronous state of a reception device with a simple configuration.

DESCRIPTION OF EMBODIMENTS

An embodiment of the present invention will be described in detail below with reference to the attached drawings. Note that the same elements are denoted with the same reference signs, and the duplicate descriptions thereof will be omitted in descriptions of the drawings. The present invention is not limited to these exemplifications. The present invention is specified in the claims, and intends to include equivalents of the claims and all alterations in the claims.

Figure 1:
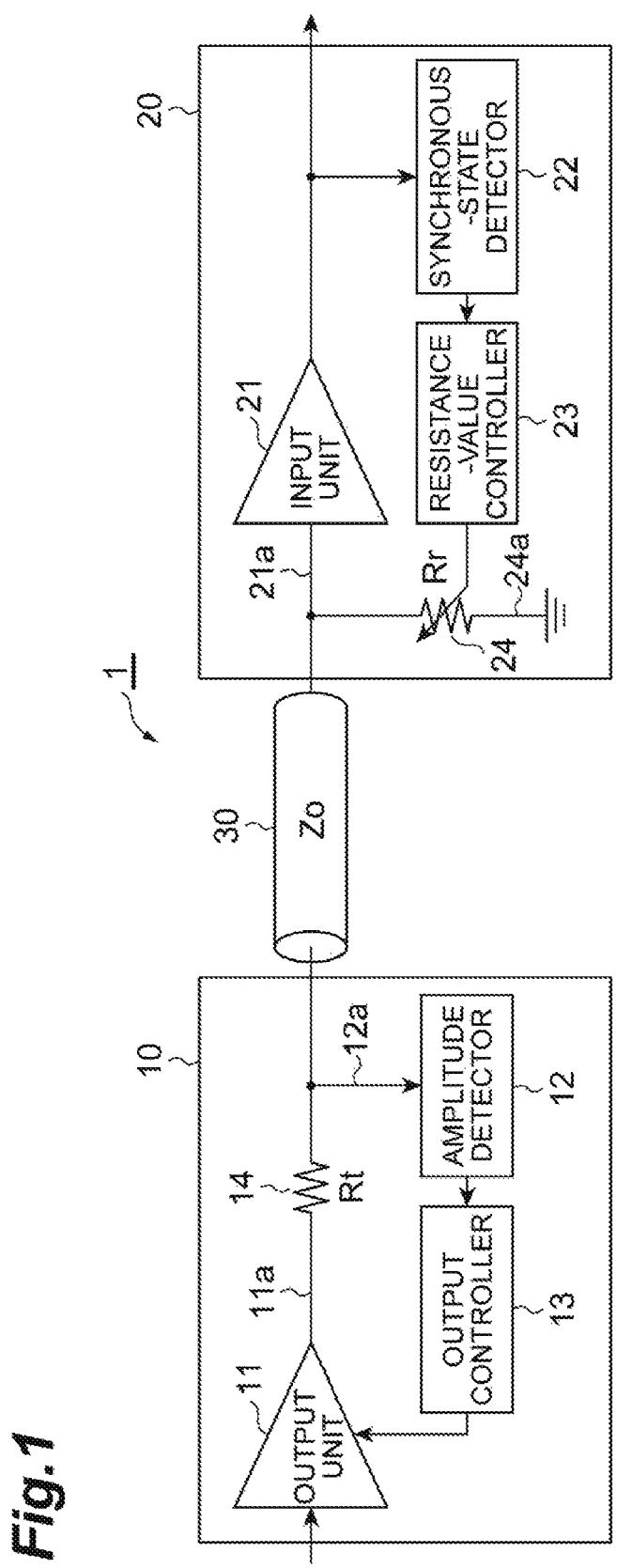
FIG. 1 is a diagram of a configuration of a transceiver system 1 according to the present embodiment.

FIG. 1 is a configuration of a transceiver system 1 according to the present embodiment. The transceiver system 1 includes a transmission device 10 and a reception device 20. The reception device 20 receives a signal transmitted from the transmission device 10.

The transmission device 10 includes an output unit 11, an amplitude detector 12, an output controller 13, and a transmission resistor 14. The output unit 11 is connected to the reception device 20 through the transmission resistor 14 and a transmission line 30. The output unit 11 outputs a signal constituting data including clock information embedded therein, to the reception device 20. The amplitude detector 12 has an input end 12a connected to a signal output end 11a of the output unit 11 through the transmission resistor 14. The amplitude detector 12 monitors a voltage variation at the input end 12a so as to detect amplitude of a signal in the output unit 11. The output controller 13 causes the output unit 11 to perform processing in response to a value or a range of the amplitude detected by the amplitude detector 12. When the amplitude detector 12 detects the amplitude in a first range, the output controller 13 causes the output unit 11 to output a signal constituting normal data (significant data, such as image data, to be transmitted from the transmission device 10 to the reception device 20 in a synchronous state). When the amplitude detector 12 detects the amplitude in a second range, the output controller 13 causes the output unit 11 to output a training signal constituting training data including the clock information.

The first range and the second range do not overlap with each other. Examples of the normal data include image data and control data necessary for an image display. The training data is data for clock training in the reception device 20, and is, for example, data in which a predetermined pattern repeats in a constant cycle. The training data preferably includes a pattern in which a logical value of 0 in a certain number of bits and a logical value of 1 in a certain number of bits alternately repeat, for example, 0101 . . . or 0011100111 . . . . This type of training data is used so that a pattern effect can be inhibited. In order to inhibit an effect of reflection of a signal (a phenomenon in which detection cannot be performed on the side of the transmission device 10 due to interference between an output wave and a reflected wave), the successive number of the values 1 and 0 in the training data is preferably as many as possible. The successive number is preferably approximately two or more times a period of time during which the signal propagates through the transmission line 30.

The reception device 20 includes an input unit 21, a synchronous-state detector 22, a resistance-value controller 23, and a terminal resistor 24. The input unit 21 is connected to the transmission device 10 through the transmission line 30, and inputs the signal constituting the data including the clock information embedded therein from the transmission device 10. The input unit 21 recovers a clock from the input signal, and samples the input signal at timing indicated by the recovered clock, so as to recover the data. The synchronous-state detector 22 detects whether the recovery clock has been in a synchronous state or an asynchronous state with respect to the input signal. When the synchronous-state detector 22 detects the synchronous state, the resistance-value controller 23 sets a resistance value of the terminal resistor 24 to a first resistance value. When the synchronous-state detector 22 detects the asynchronous state, the resistance-value controller 23 changes the resistance value of the terminal resistor 24 from the first resistance value to a second resistance value. The terminal resistor 24 is provided between an input end 21a of the input unit 21 and a reference potential end 24a (for example, a ground potential end). The terminal resistor 24 has a variable resistance value. The input unit 21 inputs the training signal constituting the training data including the clock information, outputted from the transmission device 10 after the resistance-value controller 23 has set the resistance value of the terminal resistor 24 to the second resistance value. Then, clock training is performed based on the input training signal so that the synchronous state between the training signal and the clock that has been recovered, is established.

Impedance matching is preferably performed during a period during which the normal data is transmitted from the transmission device 10 to the reception device 20. That is, the following relationship between a resistance value Rt of the transmission resistor 14, a resistance value Rr of the terminal resistor 24, and a characteristic impedance Zo of the transmission line 30, is preferably satisfied during the period during the normal data is transmitted. In the reception device 20, when the synchronous-state detector 22 detects the synchronous state, the resistance-value controller 23 sets the resistance value Rr of the terminal resistor 24 to be satisfied with the following Expression (1). Accordingly, in the transmission device 10, the amplitude detector 12 detects the amplitude in the first range so that the output unit 11 outputs the signal constituting the normal data including the clock information.

[Mathematical Formula 1]

$$Rt \approx Zo \approx Rr \qquad (1)$$

In the reception device 20, when the synchronous-state detector 22 detects the asynchronous state, the resistance-value controller 23 sets the resistance value Rr of the terminal resistor 24 to be satisfied with the following Expression (2a) or Expression (2b). Accordingly, in the transmission device 10, the amplitude detector 12 detects the amplitude in the second range so that the output unit 11 outputs the signal (the training signal) constituting the training data including the clock information.

[Mathematical Formula 2]

$$Rt \approx Zo > Rr \qquad (2a)$$

or $$Rt \approx Zo < Rr \qquad (2b)$$

A voltage value Vdet to be input into the amplitude detector 12 is expressed by the following Expression (3). Vout represents voltage amplitude of a transmission signal at the signal output end 11a of the output unit 11. When the resistance value Rr of the terminal resistor 24 has been set to the first resistance value and impedance matching has been performed, Vdet is equivalent to a half Vout and is in the first range. When the resistance value Rr of the terminal resistor 24 has been set to the second resistance value and the impedance matching has not been performed, Vdet is different from Vout and is in the second range. The amplitude detector 12 detects magnitude of the voltage value Vdet (magnitude of the amplitude to be transmitted from the transmission device 10 to the reception device 20) so that magnitude of the resistance value Rr of the terminal resistor 24 can be detected.

[Mathematical Formula 3]

$$V\det = \frac{Rr}{Rt+Rr}Vout \quad (3)$$

In the reception device 20, when the synchronous-state detector 22 detects the asynchronous state, the resistance value Rr of the terminal resistor 24 is set to be satisfied with any of the above Expression (2a) and the above Expression (2b). When the resistance value Rr of the terminal resistor 24 is set to be satisfied with the above Expression (2b), the amplitude of the transmission signal increases. In this case, the amplitude detector 12 in the transmission device 10 detects that the amplitude of the transmission signal has increased. Accordingly, the transmission device 10 can recognize that the reception device 20 has been in the asynchronous state. When the resistance value Rr of the terminal resistor 24 is set to be satisfied with the above Expression (2a), the amplitude of the transmission signal decreases. In this case, the amplitude detector 12 in the transmission device 10 detects that the amplitude of the transmission signal has decreases. Accordingly, the transmission device 10 can recognize that the reception device 20 has been in the asynchronous state. Note that, in a case where the amplitude of the transmission signal excessively decreases, when the reception device 20 receives the signal sent out from the transmission device 10 (the training data), a reception error easily occurs. Thus, this case is unfavorable.

Figure 2:
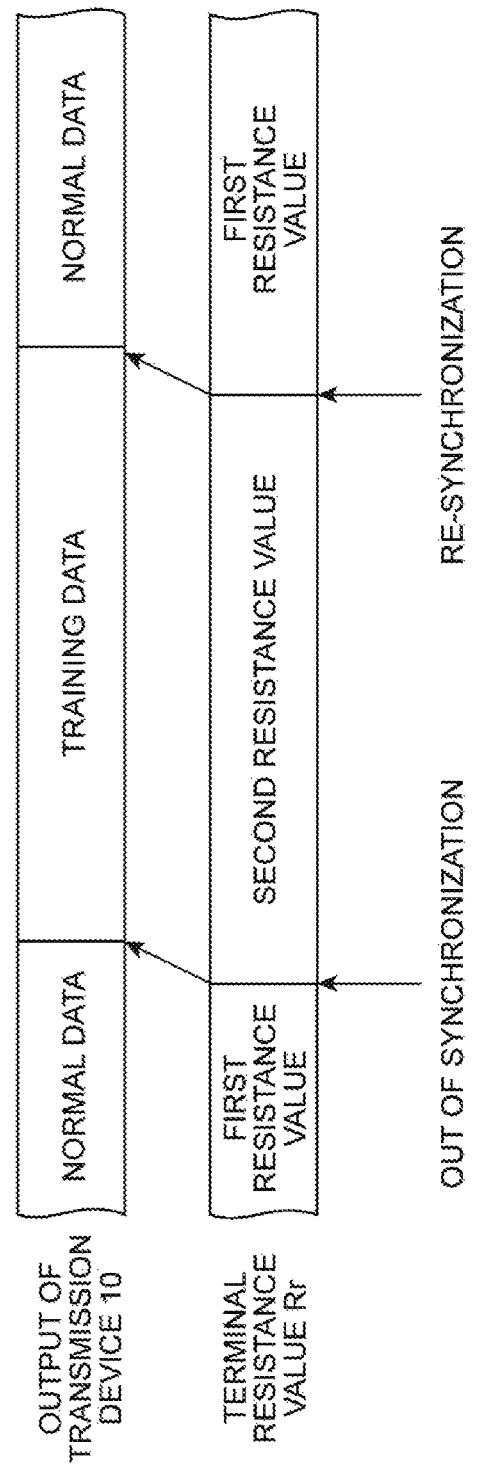
FIG. 2 is a timing chart for describing an exemplary first action of the transceiver system 1 according to the present embodiment.

FIG. 2 is a timing chart for describing an exemplary first action of the transceiver system 1 according to the present embodiment. In the exemplary first action, when the synchronous-state detector 22 detects that the synchronous state has changed to the asynchronous state (namely, out of synchronization), the resistance-value controller 23 in the reception device 20 sets the resistance value of the terminal resistor 24 to the second resistance value. Accordingly, when the amplitude detector 12 detects that the amplitude has changed from the first range to the second range, the output controller 13 in the transmission device 10 causes the output unit 11 to output the training data. The input unit 21 in the reception device 20 performs the clock training based on the training data outputted from the transmission device 10 so that the synchronous state of the reception device is established.

In addition, in the exemplary first action, when the synchronous-state detector 22 detects that the asynchronous state has changed to the synchronous state (namely, re-synchronization), the resistance-value controller 23 in the reception device 20 sets the terminal resistor 24 to the first resistance value. Accordingly, when the amplitude detector 12 detects that the amplitude has changed from the second range to the first range, the output controller 13 in the transmission device 10 causes the output unit 11 to output the normal data. The clock is recovered from a received signal in the synchronous state in the reception device 20 in which the synchronous state has previously been established. Thus, the synchronous state between the received signal or recovery data and the recovery clock, is retained.

Figure 3:
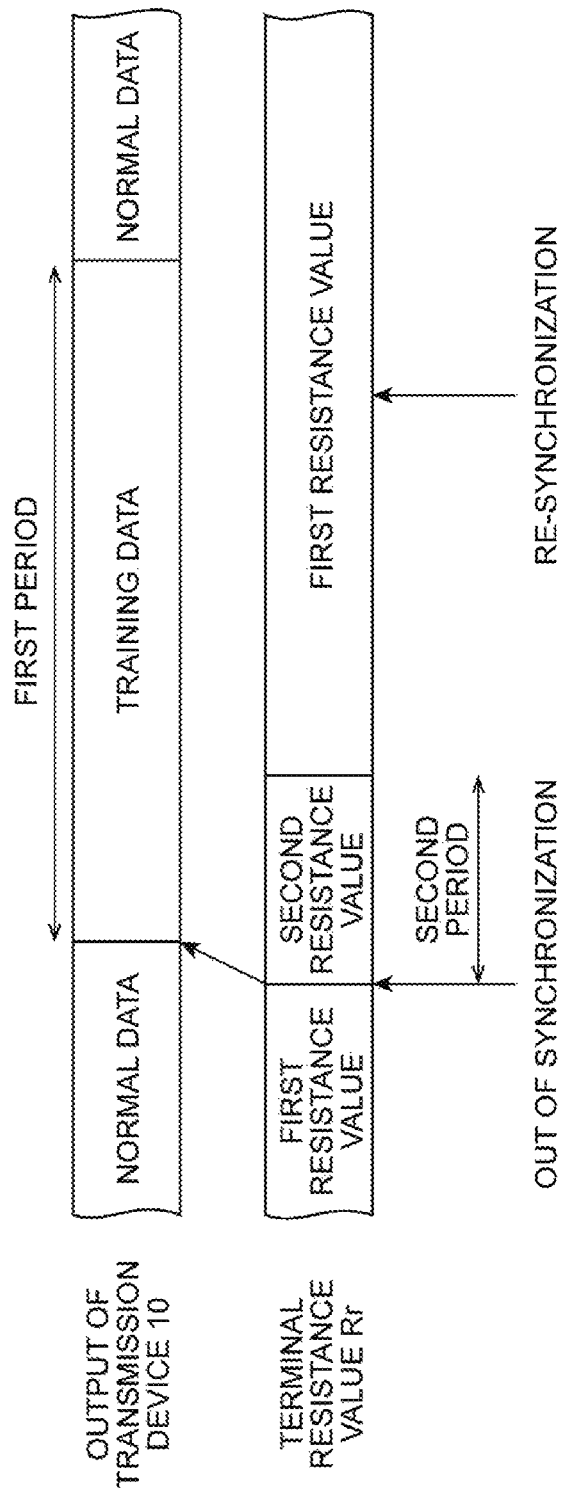
FIG. 3 is a timing chart for describing an exemplary second action of the transceiver system 1 according to the present embodiment.

FIG. 3 is a timing chart for describing an exemplary second action of the transceiver system 1 according to the present embodiment. In the exemplary second action, when the synchronous-state detector 22 detects that the synchronous state has changed to the asynchronous state (namely, out of synchronization) or that the asynchronous state has continued over a certain period of time, the resistance-value controller 23 in the reception device 20 sets the resistance value of the terminal resistor 24 to the second resistance value over a second period. The resistance-value controller 23 sets the resistance value of the terminal resistor 24 to the first resistance value after the second period has passed. Accordingly, when the amplitude detector 12 detects that the amplitude has changed from the first range to the second range, the output controller 13 in the transmission device 10 causes the output unit 11 to output the training data over a first period. When the amplitude detector detects that the amplitude has been in the first range after the first period has passed, the output controller 13 causes the output unit 11 to output the normal data. Note that the first period is longer than the second period. In addition, the first period is set so as to be a period of time sufficient for performing re-synchronization in the reception device 20.

Regarding detection of the synchronous state and the asynchronous state by the synchronous-state detector 22, in a case of encoding in which Runlength has been restricted, an error of the Runlength is detected so that the synchronous state and the asynchronous state can be detected. In addition, in a case where encoding, such as 8B10B, has been performed, a result of detection of an encoding error can be used.

In the transceiver system 1 according to the present embodiment, when the resistance-value controller 23 in the reception device 20 requests an action, except output of the training data, of the transmission device 10, the resistance-value controller 23 may set the resistance value of the terminal resistor 24 to a third resistance value over a certain period. In this case, when the amplitude detector 12 detects the amplitude in a third range, the output controller 13 in the transmission device 10 may perform processing in response to the detection result. The third range does not overlap with any of the first range and the second range.

For example, the resistance value Rr of the terminal resistor 24 in the reception device 20 is set to be a value larger than the characteristic impedance Zo of the transmission line 30 (Rr>Zo). The transmission device 10 is notified that the asynchronous state has been established in the reception device 20. The transmission device 10 outputs the training data. Conversely, the resistance value Rr of the terminal resistor 24 in the reception device 20 is set to be a value smaller than the characteristic impedance Zo of the transmission line 30 (Rr<Zo). The reception device 20 may notify the transmission device 10 of some information or may make some requests to the transmission device 10. Then, the transmission device 10 may perform processing in response to the information or the requests. For example, in order to perform an offset adjustment in the reception device 20, the resistance value Rr of the terminal resistor 24 in the reception device 20 is set so as to be satisfied with the following expression: Rr<Zo. The reception device 20 requests the transmission device 10 to output a fixed value.

Accordingly, the transmission device 10 transmits the fixed value to the reception device 20.

In addition, when the resistance value Rr of the terminal resistor 24 in the reception device 20 is infinite (namely, a state where the reception device 20 and the transmission line 30 have not been connected) the transmission device 10 may become in a low power consumption state.

According to the present embodiment, the reception device can notify the transmission device of the asynchronous state in the reception device with a simple configuration, effectively inhibiting increases of the number of transmission lines and a circuit scale.

The present invention is not limited to the above embodiment. Various modifications can be made. For example, a case where a single-ended signal is transmitted has been described in the above embodiment. The present invention can be applied to a case where a differential signal is transmitted. In a case where the differential signal is transmitted, the reception device may include a differential terminal resistor and the amplitude detector in the transmission device may detect amplitude of the differential signal.

REFERENCE SIGNS LIST 1 transceiver system
10 transmission device
11 output unit
11a signal output end
12 amplitude detector
12a input end
13 output controller
14 transmission resistor
20 reception device
21 input unit
21a input end
22 synchronous-state detector
23 resistance-value controller
24 terminal resistor
24a reference potential end
30 transmission line

The invention claimed is:

1. A transceiver system comprising:
a transmission device comprising:
an output unit connected to a reception device through a transmission line, and configured to output a signal constituting data including clock information embedded therein to the reception device;
an amplitude detector configured to detect amplitude of the signal output from the output unit in order to determine whether the reception device is in any of different types of states including a synchronous state in which the signal and a clock recovered from the signal are synchronous and an asynchronous state in which the signal and the clock are asynchronous; and
an output controller configured to control a signal output action of the output unit to cause the output unit to output a signal constituting significant data including the clock information, to be transmitted to the reception device in the synchronous state, in accordance with a detection result of the amplitude in a first range indicating the synchronous state, detected by the amplitude detector, and to cause the output unit to output a signal constituting training data including the clock information, for establishing the synchronous state in the reception device, in accordance with a detection result of the amplitude in a second range indicating the asynchronous state and different from the first range, detected by the amplitude detector;
and a reception device, wherein the reception device includes:
an input unit connected to a transmission device through a transmission line, configured to input a signal constituting data including clock information embedded therein from the transmission device, configured to recover a clock from the signal, configured to sample the signal at timing indicated by the recovered clock, and configured to recover the data;
a synchronous-state detector configured to detect any of a synchronous state in which the signal and the clock are synchronous and an asynchronous state in which the signal and the clock are asynchronous;
a terminal resistor provided between an input end of the input unit and a reference potential end, and having a variable resistance value; and
a resistance-value controller configured to set the resistance value of the terminal resistor to a first resistance value in accordance with a detection result of the synchronous state between the signal and the clock, detected by the synchronous-state detector, and configured to set the resistance value of the terminal resistor to a second resistance value different from the first resistance value in accordance with a detection result of the asynchronous state between the signal and the clock, detected by the synchronous-state detector.

2. The transceiver system according to claim 1,
wherein the output controller controls the output unit to perform another action except the output of the training data, in accordance with a detection result of the amplitude in a third range different from both of the first and second ranges, detected by the amplitude detector, and
wherein the resistance-value controller sets the resistance value of the terminal resistor to a third resistance value different from any of the first and second resistance values over a certain period when the reception device request an action, except output of training data, of the transmission device.

3. The transceiver system according to claim 2,
wherein the amplitude detector has an input end c connected to a signal output end of the output unit through a transmission resistor, and monitors a voltage variation at the input end so as to detect the amplitude of the signal.

4. A transceiver system comprising:
a transmission device comprising:
an output unit connected to a reception device through a transmission line, and configured to output a signal constituting data including clock information embedded therein to the reception device;
an amplitude detector configured to detect amplitude of the signal output from the output unit in order to determine whether the reception device is in any of a synchronous state in which the signal and a clock recovered from the signal are synchronous and an asynchronous state in which the signal and the clock are asynchronous; and
an output controller configured to control a signal output action of the output unit to cause the output unit to output a signal constituting significant data including the clock information, to be transmitted to the reception device in the synchronous state, in accordance with a detection result of the amplitude in a first range indicating the synchronous state, detected by the amplitude detector, and to cause the output unit to output a signal constituting training data including the clock information, for establishing the synchronous state in the reception device over a predetermined period, and also to cause the output unit to output the signal constituting the significant data including the clock information after the predetermined period has passed, in accordance with a detection result of the amplitude changed from the first range to a second range indicating the asynchronous state and different from the first range, detected by the amplitude detector;

and a reception device, wherein the reception device includes:
an input unit connected to a transmission device through a transmission line, configured to input a signal constituting data including clock information embedded therein from the transmission device, configured to recover a clock from the signal, configured to sample the signal at timing indicated by the recovered clock, and configured to recover the data;
a synchronous-state detector configured to detect any of a synchronous state in which the signal and the clock are synchronous and an asynchronous state in which the signal and the clock are asynchronous;
a terminal resistor provided between an input end of the input unit and a reference potential end, and having a variable resistance value; and
a resistance-value controller configured to set the resistance value of the terminal resistor to a second resistance value different from a first resistance value indicating the synchronous state, over a predetermined period, and configured to change the resistance value of the terminal resistor from the second resistance value to the first resistance value after the predetermined period has passed, in accordance with a detection result of a change from the synchronous state to the asynchronous state or duration of the asynchronous state during a certain period of time or more, detected by the synchronous-state detector.

5. The transceiver system according to claim 4,
wherein the output controller controls the output unit to perform another action except the output of the training data, in accordance with a detection result of the amplitude in a third range different from both of the first and second ranges, detected by the amplitude detector, and
wherein the resistance-value controller sets the resistance value of the terminal resistor to a third resistance value different from any of the first and second resistance values over a certain period when the reception device request an action, except output of training data, of the transmission device.

6. The transceiver system according to claim 5,
wherein the amplitude detector has an input end c connected to a signal output end of the output unit through a transmission resistor, and monitors a voltage variation at the input end so as to detect the amplitude of the signal.

7. A transceiver system comprising:
a transmission device comprising:
an output unit connected to a reception device through a transmission line, and configured to output a signal constituting data including clock information embedded therein to the reception device;
an amplitude detector configured to detect amplitude of the signal output from the output unit in order to determine whether the reception device is in any of different types of states including a synchronous state in which the signal and a clock recovered from the signal are synchronous and an asynchronous state in which the signal and the clock are asynchronous;
and an output controller configured to control a signal output action of the output unit to cause the output unit to output a signal constituting significant data including the clock information, to be transmitted to the reception device in the synchronous state, in accordance with a detection result of the amplitude in a first range indicating the synchronous state, detected by the amplitude detector, and to cause the output unit to output a signal constituting training data including the clock information, for establishing the synchronous state in the reception device, in accordance with a detection result of the amplitude in a second range indicating the asynchronous state and different from the first range, detected by the amplitude detector;

and a reception device, wherein the reception device includes:
an input unit connected to a transmission device through a transmission line, configured to input a signal constituting data including clock information embedded therein from the transmission device, configured to recover a clock from the signal, configured to sample the signal at timing indicated by the recovered clock, and configured to recover the data;
a synchronous-state detector configured to detect any of a synchronous state in which the signal and the clock are synchronous and an asynchronous state in which the signal and the clock are asynchronous;
a terminal resistor provided between an input end of the input unit and a reference potential end, and having a variable resistance value; and
a resistance-value controller configured to set the resistance value of the terminal resistor to a second resistance value different from a first resistance value indicating the synchronous state, over a predetermined period, and configured to change the resistance value of the terminal resistor from the second resistance value to the first resistance value after the predetermined period has passed, in accordance with a detection result of a change from the synchronous state to the asynchronous state or duration of the asynchronous state during a certain period of time or more, detected by the synchronous-state detector,
wherein the output controller controls the output unit to perform another action except the output of the training data, in accordance with a detection result of the amplitude in a third range different from both of the first and second ranges, detected by the amplitude detector, and
wherein the resistance-value controller sets the resistance value of the terminal resistor to a third resistance value different from any of the first and second resistance values over a certain period when the reception device request an action, except output of training data, of the transmission device.

8. The transceiver system according to claim 7,
wherein the amplitude detector has an input end c connected to a signal output end of the output unit through a transmission resistor, and monitors a voltage variation at the input end so as to detect the amplitude of the signal.

9. A transceiver system comprising:
a transmission device comprising:
- an output unit connected to a reception device through a transmission line, and configured to output a signal constituting data including clock information embedded therein to the reception device;
- an amplitude detector configured to detect amplitude of the signal output from the output unit in order to determine whether the reception device is in any of a synchronous state in which the signal and a clock recovered from the signal are synchronous and an asynchronous state in which the signal and the clock are asynchronous; and
- an output controller configured to control a signal output action of the output unit to cause the output unit to output a signal constituting significant data including the clock information, to be transmitted to the reception device in the synchronous state, in accordance with a detection result of the amplitude in a first range indicating the synchronous state, detected by the amplitude detector, and to cause the output unit to output a signal constituting training data including the clock information, for establishing the synchronous state in the reception device over a predetermined period, and also to cause the output unit to output the signal constituting the significant data including the clock information after the predetermined period has passed, in accordance with a detection result of the amplitude changed from the first range to a second range indicating the asynchronous state and different from the first range, detected by the amplitude detector;

and a reception device, wherein the reception device includes:
- an input unit connected to a transmission device through a transmission line, configured to input a signal constituting data including clock information embedded therein from the transmission device, configured to recover a clock from the signal, configured to sample the signal at timing indicated by the recovered clock, and configured to recover the data;
- a synchronous-state detector configured to detect any of a synchronous state in which the signal and the clock are synchronous and an asynchronous state in which the signal and the clock are asynchronous;
- a terminal resistor provided between an input end of the input unit and a reference potential end, and having a variable resistance value; and
- a resistance-value controller configured to set the resistance value of the terminal resistor to a first resistance value in accordance with a detection result of the synchronous state between the signal and the clock, detected by the synchronous-state detector, and configured to set the resistance value of the terminal resistor to a second resistance value different from the first resistance value in accordance with a detection result of the asynchronous state between the signal and the clock, detected by the synchronous-state detector,
- wherein the output controller controls the output unit to perform another action except the output of the training data, in accordance with a detection result of the amplitude in a third range different from both of the first and second ranges, detected by the amplitude detector, and
- wherein the resistance-value controller sets the resistance value of the terminal resistor to a third resistance value different from any of the first and second resistance values over a certain period when the reception device request an action, except output of training data, of the transmission device.

10. The transceiver system according to claim 9,
wherein the amplitude detector has an input end c connected to a signal output end of the output unit through a transmission resistor, and monitors a voltage variation at the input end so as to detect the amplitude of the signal.

* * * * *